United States Patent
Huang et al.

(10) Patent No.: US 9,654,249 B2
(45) Date of Patent: May 16, 2017

(54) ULTRA-WIDE RANGE OPTICAL WAVELENGTH CONVERTER BY DIRECT SIGNAL TRANSLATION FROM INTEGRATED COHERENT RECEIVER TO DUAL-POLARIZATION IQ MODULATOR

(71) Applicant: NEC Laboratories America, Inc., Princeton, NJ (US)

(72) Inventors: Yue-Kai Huang, Princeton, NJ (US); Shaoliang Zhang, Princeton, NJ (US); Fatih Yaman, Monmouth Junction, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/846,348

(22) Filed: Sep. 4, 2015

(65) Prior Publication Data
US 2016/0105238 A1    Apr. 14, 2016

Related U.S. Application Data

(60) Provisional application No. 62/063,008, filed on Oct. 13, 2014.

(51) Int. Cl.
*H04B 10/04* (2006.01)
*H04J 14/06* (2006.01)
(Continued)

(52) U.S. Cl.
CPC .............. *H04J 14/06* (2013.01); *H04B 10/29* (2013.01); *H04B 10/61* (2013.01)

(58) Field of Classification Search
CPC ......... H04J 14/06; H04B 10/61; H04B 10/29; H04B 10/532; H04B 10/2537;
(Continued)

(56) References Cited

U.S. PATENT DOCUMENTS

2014/0003815 A1* 1/2014 Mertz ................ H04J 14/06
398/65

OTHER PUBLICATIONS

Huang, M.H. et al., "Wavelength Converter for Polarization-Multiplexed 100-G Transmission With Multilevel Modulation Using a Bismuth Oxide-Based Nonlinear Fiber," IEEE Photonics Technology Letters, vol. 22, No. 24, Dec. 2010. (pp. 1832-1834).
(Continued)

*Primary Examiner* — M. R. Sedighian
(74) *Attorney, Agent, or Firm* — Joseph Kolodka

(57) ABSTRACT

A method of wavelength conversion without polarization tracking is provided. A system is also provided that converts an input signal into an output signal of a different wavelength that contains all of the amplitude, phase, and polarization information of the original signal. The method includes separating, using a polarization-diversity optical mixer, an input optical signal of a first wavelength into a plurality of electrical signals containing amplitudes and phases while maintaining the polarization information of the input signal, converting each of the amplitudes and phases into individual photo-currents using a photo-diode, converting each of the output photo-currents into voltages using an amplifier, modulating the multitude of voltages to a second wavelength using a modulator, where the separated electrical signals are up-converted to generate an output optical signal that maintains the same amplitude, phase, and polarization information as was contained in the input signal.

17 Claims, 4 Drawing Sheets

(51) Int. Cl.
*H04B 10/61* (2013.01)
*H04B 10/29* (2013.01)

(58) Field of Classification Search
CPC .. H04B 10/505; H04B 10/504; H04B 10/541; H04B 10/5051; H04B 10/5055; H04B 10/2569
USPC .......................................................... 398/184
See application file for complete search history.

(56) References Cited

OTHER PUBLICATIONS

Jopson, R.M. et al., "Polarisation-Independent phase conjugation of lightwave signals," Electronics Letters, vol. 29, No. 25, Dec. 1993. (pp. 2216-2217).

Ma, J., et al., "Wavelength Conversion Based on Four-Wave Mixing in High-Nonlinear Dispersion Shifted Fiber Using a Dual-Pump Configuration," Journal of Lightwave Technology, vol. 24, No. 7, Jul. 2006. (pp. 2851-2858).

Marhic, M.E. et al., "Comments on Wavelength Conversion Based on Four-Wave Mixing in High-Nonlinear Dispersion Shifted Fiber Using a Dual-Pump Configuration," Journal of Lightwave Technology, vol. 27, No. 24, Dec. 2009.

Wong, K.K.Y, et al., "Polarization-Independent Two-Pump Fiber Optical Parametric Amplifier," IEEE Photonics Technology Letters, vol. 14, No. 7, Jul. 2002. (pp. 911-913).

\* cited by examiner

ULTRA-WIDE RANGE OPTICAL WAVELENGTH CONVERTER BY DIRECT SIGNAL TRANSLATION FROM INTEGRATED COHERENT RECEIVER TO DUAL-POLARIZATION IQ MODULATOR

RELATED APPLICATION INFORMATION

This application claims priority to provisional application No. 62/063,008 filed Oct. 13, 2014, the contents of which are incorporated herein by reference.

BACKGROUND OF THE INVENTION

Technical Field

The present invention relates generally to a device and methods to convert wavelengths and, in particular, to signal wavelength conversion while maintaining polarization information.

Description of the Related Art

Due to the ever increasing demand from applications such as video sharing and streaming, machine-to-machine communications, mobile data and gaming, as well as emerging internet-based applications, core network traffic continues to grow at a double digit rate. In order to handle this continuous growth in traffic demand, carrier networks increase their capacity in a scalable and cost-effective manner. It is therefore paramount for network operators to become more efficient in data transport.

Existing approaches address the problem of continuous growth of in traffic demand for carrier networks using all-optical wavelength conversion (AOWC) are complex and cost-ineffective. Additionally, polarization insensitivity creates signal power fluctuation in, e.g., traditional 10 G/40 G networks and also cause polarization dependent loss (PDL), thus, e.g., causing a performance drop for the current 100 G, future 400 G/IT networks, and beyond, where polarization-multiplexed transmission is used for improved spectral efficiency. With the current state of AOWC, the conversion range is a concern. Achieving full range conversion in C-band, L-band, or both is needed, especially since it is quite difficult to achieve AOWC with wide bandwidth in practice without using complicated dispersion management in fiber.

To achieve enough signal conversion gain using AOWC, either a large nonlinearity coefficient or huge optical pump power may be needed, which can result in having to invest in either new nonlinearity fiber, which is scarce in supply, or high power optical amplifiers, which are expensive and costly to operate. Furthermore, in order to achieve the desired WC gain, some demonstrations have to avoid stimulated Brillouin scattering (SBS) in nonlinear fiber by applying certain engineering techniques, such as phase modulating the pump lasers or stretching the fiber sections at different tensions, which create additional cost and complexity.

SUMMARY

According to an aspect of the present principles, a wavelength converter is provided that comprises a optical hybrid mixer configured to separate an optical signal of a first wavelength into a plurality of amplitudes and phases and which includes a polarization-diverse optical hybrid configured to separate an incoming input signal into amplitude and phase while maintaining polarization information, a photo-diode configured to convert each amplitude or phase into a photo-current, and an amplifier configured to convert each photo-current into a voltage. The converter additionally includes a signal combiner configured to modulate the separated optical signal of first wavelength to a second wavelength and then combine the split modulated portions of the optical signal into an output optical signal of a second wavelength while maintaining the polarization information of the original signal and which includes a modulator configured to modulate the amplitudes and phases to the second wavelength.

According to another aspect of the present principles, a method of wavelength conversion is provided. The method includes separating, using a polarization-diversity optical mixer, an input optical signal of a first wavelength into a plurality of amplitudes and phases while maintaining the polarization information of the input signal, converting each of the amplitudes and phases into individual photo-currents using a photo-diode, converting each of the output photo-currents into voltages using an amplifier, modulating the multitude of voltages to a second wavelength using a modulator, and recombining the plurality of amplitudes and phases to generate an output optical signal that maintains the polarization information of the input signal.

These and other advantages of the invention will be apparent to those of ordinary skill in the art by reference to the following detailed description and the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
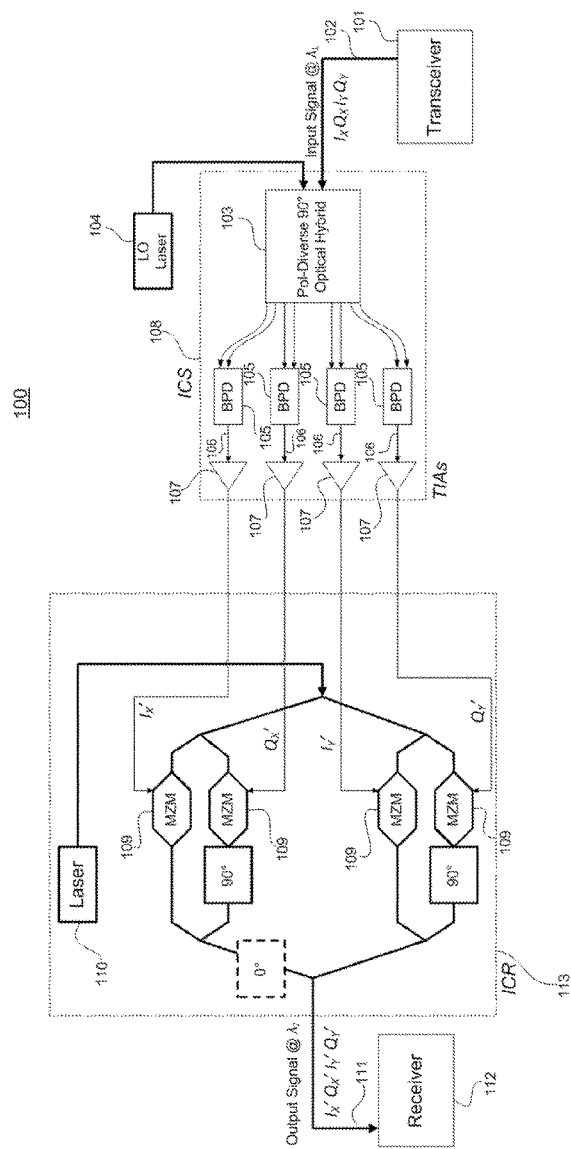
FIG. 1 is a block/flow diagram of an exemplary system for wide-band conversion in accordance with the present principles.

The present principles are directed to systems and methods for translating signals from an integrated coherent receiver to a dual-polarization in-phase/quadrature (IQ) modulator according to various embodiments.

Different from a receiver, in the present principles, the incoming signal is not processed to recover the carried data. Rather, an input signal is separated into electrical lanes and the electrical lanes are modulated to a new optical wavelength. The polarities of each of the modulator arms are maintained so that the X and Y polarization signals are rotated/flipped the same way. The signal output will then carry the same information contained in the input signal, along with the accumulated noise and fiber dispersion, onto a new wavelength.

The present principles are directed to an approach that can be less complex than AOWC, since the wavelength conversion bandwidth of the present principles depends solely on the availability of lasers, modulators, and photo-diodes in the operating region, and more cost-effectiveness than all-optical wavelength conversion (AOWC), since the components can be used for the present principles are commercially available and also in mass production quantities. Since the entire incoming signal information on both polarizations is directly translated to the new optical wavelength, true polarization insensitivity can be achieved when special cares are observed during the recombining of the two polarizations at the modular output. Unlike in some non-four wave mixing (FWM) AOWC methods, accumulated fiber dispersion will not be an issue in the present principles.

Advantageously, the present principles describe a method of obtaining polarization sensitivity without creating signal power fluctuations in, e.g., traditional 10 G/40 G networks and without causing polarization dependent loss (PDL). This aids in the prevention of a performance drop for the current 100 G, future 400 G/IT networks, and beyond.

The technique of down-converting signal phase and amplitude to electrical signals, or up-converting the signal phase and amplitude to optical signals with polarization diversity, are well known in the industry. Another advantage of the present principles is that wavelength conversion is conducted using the down-conversion and up-conversion process, without doing data recovery/detection which will require a digital signal processor (DSP) chip, increasing power consumption and latency.

Yet another advantage of the present principles is that no polarization tracking is needed during the process of wavelength conversion. The present principles describe a method that would allow a converter to input optical signal having any polarization orientation, measure the incoming signal information on multiple electric lanes, and re-modulate the electric lanes on a new optical wavelength. The re-modulated electric lanes are then combined to produce an output optical signal.

In one embodiment, the complete information of the polarization multiplexed optical signal is down-converted to four electrical lanes ($X_I'$, $X_Q'$, $Y_I'$, $Y_Q'$) just as a coherent receiver treats the incoming optical signal using the polarization-diversity optical mixer and four sets of photo-diodes, with a local oscillator (LO) laser tuned to an incoming signal wavelength. In another embodiment, the photo-diodes are balanced photo-diodes (BPDs). This allows for true polarization insensitive conversion through polarization and phase-diversity transcription. By retaining the polarization information after the conversion, the signals on both polarizations can be extrapolated without distortion or crosstalk during the conversion process.

A signal regenerator using an optical-electrical-optical (OEO) approach may achieve a similar WC function. However, in this approach, a data recovery function at the receiver and a data encoding function at the transmitter are needed. Advantageously, in the present principles, such functions are not needed. This significant difference offers at least two advantages. First, free of these functions, which are usually implemented in a digital signal processor, the cost, size, and power consumptions of the wavelength convertor could be reduced. Second, these functions impose additional transmission latency when the signal is regenerated, and a lack of these functions would reduce this transmission latency. In fact, by directly translating the information to a new wavelength, the imposed latency is negligible.

In addition, by translating the signal information directly from the input wavelength to the output wavelength without going through data recovery, and thus signal regeneration, the conversion speed can be very fast without the added latency of decoding and encoding in digital signal processing (DSP). This is important for speed-sensitive applications such as electronic trading. Cost and power consumption can also be lowered in our scheme by avoiding DSP or even modular drivers if trans-impedance amplifiers (TIAs) can provide enough voltage swing.

Advantageously, the present principles can be used in the field of fiber optics and, in particular, during channel switching in an optical fiber network. The present principles can be used to offer new wavelength routing functionality in a reconfigurable optical add/drop multiplexer (ROADM) in order to avoid conflicts or increase bandwidth utilization. The optical channels, which undergo wavelength conversion, can carry universal data type, supporting applications such as video streaming or file transferring.

It should be understood that embodiments described herein may be entirely hardware or may include both hardware and software elements, which includes but is not limited to firmware, resident software, microcode, etc. In a preferred embodiment, the present invention is implemented in hardware. The present invention may be a system, a method, and/or a computer program product. The computer program product may include a computer readable storage medium (or media) having computer readable program instructions thereon for causing a processor to carry out aspects of the present invention.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram shows an exemplary system 100 for wide-band conversion in accordance with the present principles.

A transceiver 101 and a first light emitting device 104, tuned to the wavelength of the incoming signal 102, are attached to a polarization-diversity optical hybrid 103, designed to down-convert amplitude and phase information from an input signal 102 while maintaining polarization information. In one embodiment, the transceiver 101 can be a transmitter, transceiver, receiver, or any combination thereof. In one embodiment, the first light emitting device 104 is a local oscillator (LO) laser.

The transceiver 101 sends the signal 102 which has experienced wavelength dropping through a reconfigurable add/drop multiplexer (ROADM), to the polarization-diversity optical mixer 103. The signal 102 contains the complete information of an incoming polarization multiplexed optical signal. In one embodiment, the input signal 102 has 90 degree polarization and the polarization-diversity optical mixer 103 separates the signal into four electric lanes, with each lane containing both phase and amplitude information of the signal in two polarizations, i.e., $I_X$, $Q_X$, $I_Y$, and $Q_Y$.

The polarization-diversity optical mixer is attached to at least one photo-diode 106 to convert the incoming signal 102 into an output photo-current. Each photo-diode 106 is then connected to an amplifier 107 which converts each photo-current into a voltage. In one embodiment, the polarization-diversity mixer 103, the photo-diodes 105, and the amplifiers 107 are integrated into one package called an integrated coherent receiver (ICR) 108. In one embodiment, the photo-diodes 106 are balanced photo-diodes. In one embodiment, the amplifiers 107 are trans-impedance amplifiers. After passing through the photo-diodes 105, the photo-diode output photo-currents 106 are converted to voltages by amplifiers 107.

The down-converted lanes 105 contain a signal ($I_X'$, $Q_X'$, $I_Y'$, $Q_Y'$) with relation to the original as:

$$I_X' + iQ_X' = ((I_X + iQ_X)\cos\phi + (I_Y + iQ_Y)\sin\phi)e^{i(\omega_{\lambda_1} - \omega_{LO})t}$$

$$I_Y' + iQ_Y' = (-(I_X + iQ_X)\sin\phi + (I_Y + iQ_Y)\cos\phi)e^{i(\omega_{\lambda_1} - \omega_{LO})t}$$

Where $\phi$ is the angle of difference between the signal's orientation of polarization and the ICSs.

In one embodiment, the LO laser 104 is a stand-alone laser. In another embodiment, the LO laser 104 is a split off from the optical source of a transponder sitting at the local not and reuses the now emptied old wavelength.

Each of the amplifiers 107, in addition to a second light emitting device 110, are connected to a modulator 109, which generates a new polarization-multiplexed signal at a new wavelength for each of the amplitudes and phases which will be set using an the wavelength of the second light emitting device 110. The optical phases of the newly converted amplitudes and phases manipulated and then recombined into an output signal 111, which contains the amplitude, phase, and polarization information of the input signal 102. In one embodiment, the second light emitting device 110 and the at least one modulator 109 are integrated into one package called integrated coherent transceiver (ICT) 113. In one embodiment, the second light emitting device 110 is an input laser. In one embodiment, the modulator 109 is a dual-nested Mach-Zehnder modulator (MZM).

After passing through the amplifiers 107, the electrical lanes are applied to the inputs of the modulators 109 to generate a new polarization-multiplexed signal at a new wavelength which will be set using the wavelength of the second light emitting device.

Once the individual beams have successfully passed through the modulators 109, the beams are recombined into a new signal 111, with components $I_X'$, $Q_X'$, $I_Y'$, and $Q_Y'$ and can be received by a receiver 112.

The output signal 111 at the new frequency can have the information at two polarizations in the following orientation:

$$S_X' = (I_X' + iQ_X')e^{i\omega_{\lambda_2}t} = ((I_X + iQ_X)\cos\phi + (I_Y + iQ_Y)\sin\phi)e^{i(\omega_{\lambda_2} + \omega_{\lambda_1} - \omega_{LO})t}$$

$$S_Y' = (I_Y' + iQ_Y')e^{i(\omega_{\lambda_2}t + \theta)} = (-(I_X + iQ_X)\sin\phi + (I_Y + iQ_Y)\cos\phi)e^{i(\omega_{\lambda_2} + \omega_{\lambda_1} - \omega_{LO})t + \theta}$$

The value $\theta$ is an additional optical phase difference between the two polarizations and is contributed by the delay differences after splitting the lasers via a polarization beam combiner (PBC) in both the ICR 108 and the modulator 109.

Figure 2:
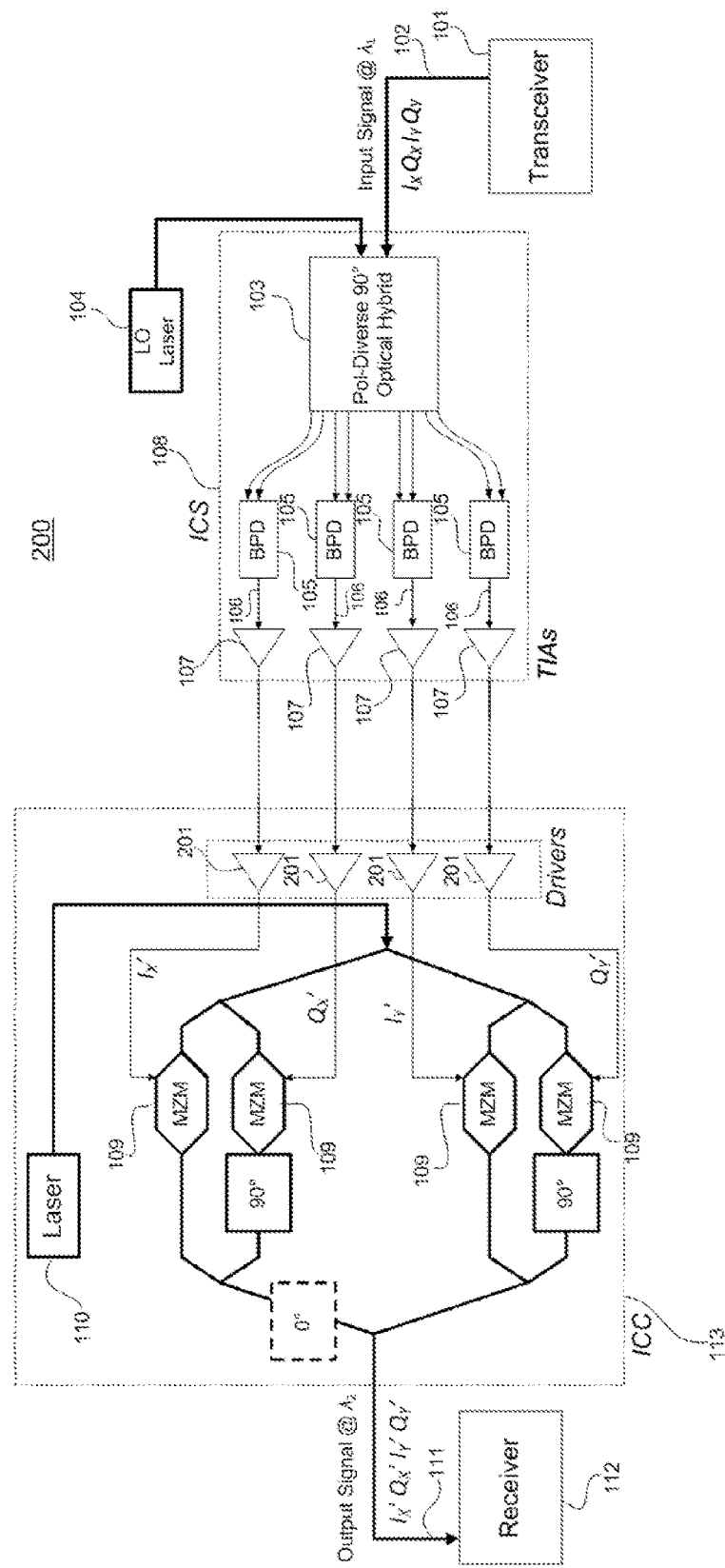
FIG. 2 is a block/flow diagram of an exemplary system for wide-band conversion in accordance with the present principles.

FIG. 2 shows another exemplary system 200 for wideband conversion in accordance with the present principles.

In one embodiment, after the voltages have passed through the amplifiers 107, but before passing through the modulators 109, the electrical lanes pass through modulator drivers 201. In yet another embodiment, the drivers 201 are integrated into the ICT 113 module. The ICC 113 may be more suitable for smaller size and lower cost if, based on the TIA 107 output swing level and the drive voltage of the modulator 201, it is determined that one or more modulator drivers 108 are needed.

Figure 3:
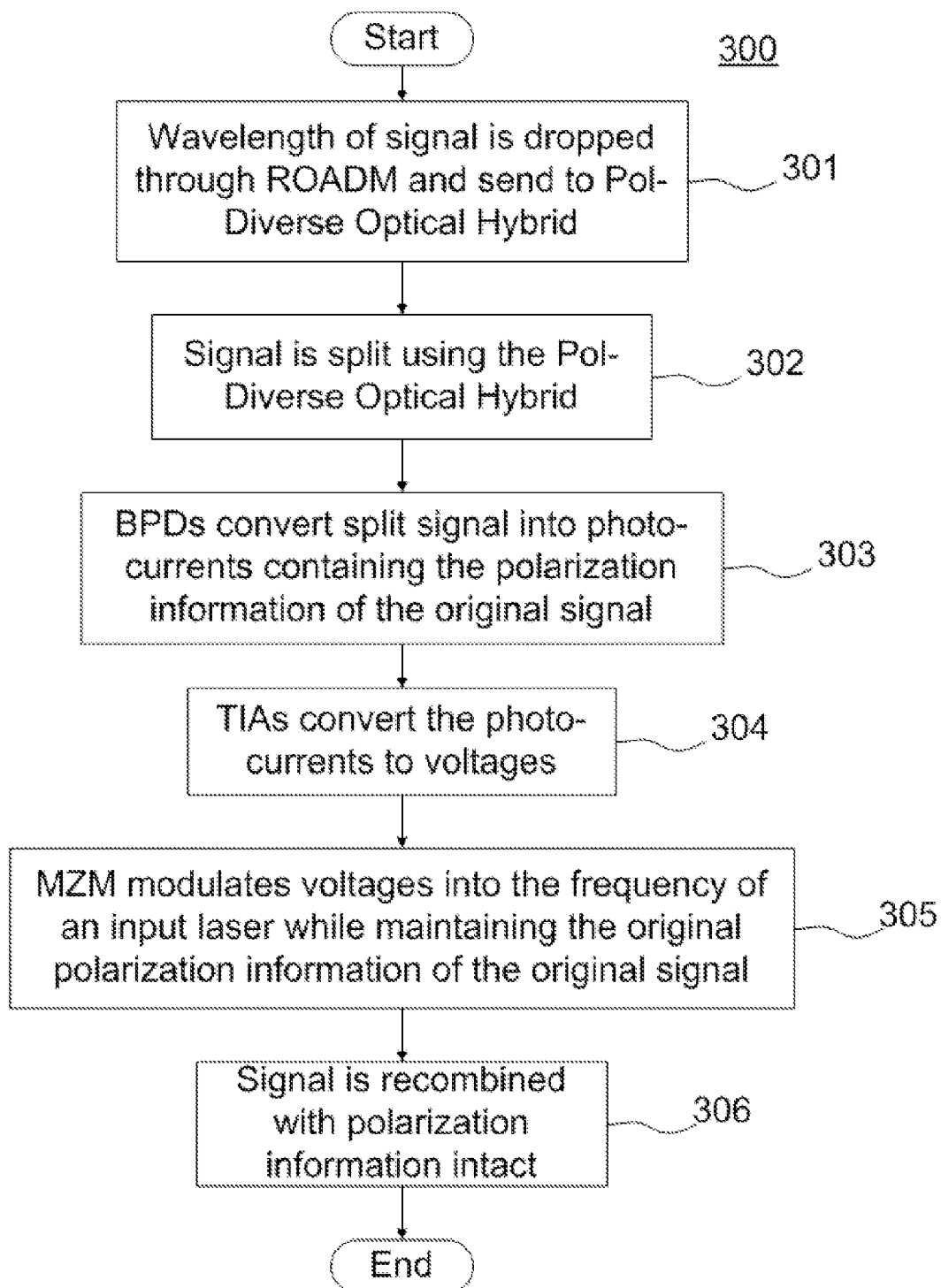
FIG. 3 is a block/flow diagram of an exemplary method for wide-band conversion in accordance with the present principles.

FIG. 3 shows an exemplary method 300 for wide-band conversion in accordance with the present principles.

At block 301, a transceiver sends a signal that has experienced wavelength dropping through ROADM to a polarization-diversity optical mixer. The signal contains the complete information of an incoming polarization multiplexed optical signal, i.e., both the phase and amplitude information of the signal in two polarizations, i.e., $I_X$, $Q_X$, $I_Y$, and $Q_Y$. In one embodiment, the amplitude and phase are in any number or state of polarizations not necessarily aligned with the optical mixer's polarization orientation.

At block 302, the information in the signal is down-converted to separate electrical lanes using a coherent receiver means of the polarization-diversity optical splitter with a first light emitting device tuned to the frequency of the incoming signal. These separated electrical lanes each contain both the amplitude and phase of the original signal while maintaining the polarization information of the original signal.

At block 303, photo-diodes convert the split portions of the original signal into photo-currents. These photo-currents include all of the polarization information of the original polarized signal.

At block 304, the photo-currents pass through amplifiers, which convert the photo-currents to voltages, maintaining the polarization information. In one embodiment, the polarization-diversity splitter, the photo-diodes, and the amplifiers are integrated into one package called the ICR. Once the lanes are down-converted, the down-converted lanes contain a new signal, i.e., $I_X'$, $Q_X'$, $I_Y'$, and $Q_Y'$, with relation to the original as:

$$I_X' + iQ_X' = ((I_X + iQ_X)\cos\phi + (I_Y + iQ_Y)\sin\phi)e^{i(\omega_{\lambda_1} - \omega_{LO})t}$$

$$I_Y' + iQ_Y' = (-(I_X + iQ_X)\sin\phi + (I_Y + iQ_Y)\cos\phi)e^{i(\omega_{\lambda_1} - \omega_{LO})t}$$

Where $\phi$ is the angle of difference between the signal's orientation of polarization and the ICRs.

In another embodiment, after the voltages have passed through the amplifiers, but before passing through the modulators, the electrical lanes are passed through modulator drivers. These modulators could be optional depending on the amplifiers output swing level and the drive voltage of the modulator. If drivers are needed, then an ICT module will probably more suitable for smaller size and lower cost.

At block 305, the voltages are modulated. The voltages pass through modulators which modulate the voltages into the frequency of a second light emitting device while maintaining the original polarization information of the original signal. In one embodiment, the modulator is a dual-nested Mach-Zehnder modulator (MZM).

At block 306, the newly converted signal is recombined at the new wavelength with the original polarization information, which can include both the amplitude and phase of the original signal. This recombined signal can then be received by a receiver.

Figure 4:
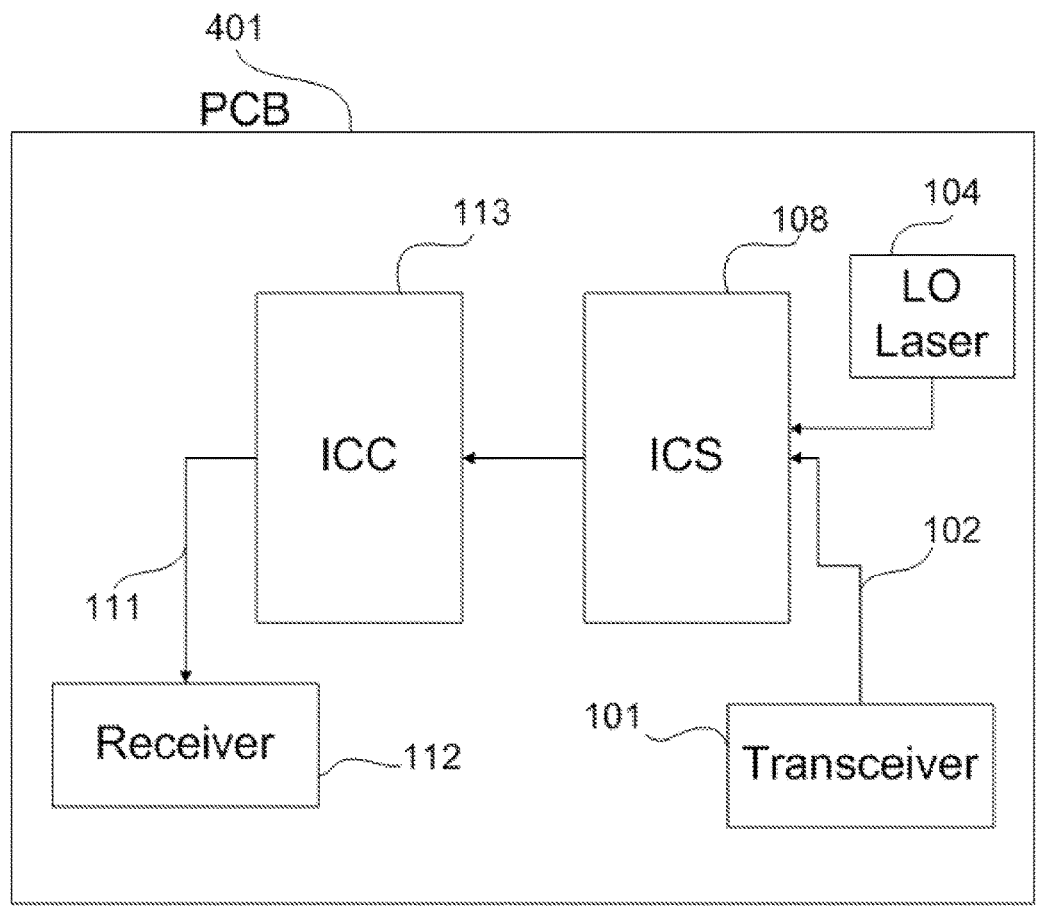
FIG. 4 is a block/flow diagram of an exemplary printed circuit board in accordance with the present principles.

FIG. 4 shows a block/flow diagram of an exemplary printed circuit board in accordance with the present principles.

In one embodiment, the present principles are integrated onto a printed circuit board (PCB) 401. In one embodiment, a transceiver 101, first light emitting device 104, ICR 108, ICT 113, and receiver 112 are attached to a PCB.

In one embodiment, the ICR and ICT are integrated into one module. For example, such an integration can be done for power or size improvements or to aid in conformity with industry standards.

In one embodiment, the LO laser 104 sends the input signal 102, and the first light emitting device 104 sends the laser beam with the wavelength of the input signal 102, into the ICR 108. Once the input signal 102 is separated into voltages comprising both the amplitude and phase of the original input signal 102 while maintaining polarization information, the voltages travel to the ICT 113, where the voltages are modulated to a new wavelength and combined into an output signal 111. The receiver 112 then receives the output signal 111.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description of Preferred Embodiments, but rather from the claims as interpreted according to the full breadth permitted by the patent laws. Additional information is provided in the Additional Information to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A wavelength converter, comprising:
a signal down-converter configured to down-convert an optical signal of a first wavelength into a plurality of amplitudes and phases and which includes a polarization-diverse optical mixer configured to separate an incoming input signal into a plurality of split portions of amplitudes and phases while maintaining polarization information, a photo-diode configured to convert each amplitude or phase into a photo-current, and an amplifier configured to convert each photo-current into a voltage,
wherein the down-converter generates down-converted signals ($I_X'$, $Q_X'$, $I_Y'$, $Q_Y'$) with relation to an original signal ($I_X$, $Q_X$, $I_Y$, $Q_Y$) with a local oscillator (LO) laser tuned to an incoming signal wavelength $\lambda 1$ as:

$$I_X' + iQ_X' = ((I_X + iQ_X)\cos\phi + (I_Y + iQ_Y)\sin\phi)e^{i(\omega_{\lambda_1} - \omega_{LO})t}$$

$$I_Y' + iQ_Y' = (-(I_X + iQ_X)\sin\phi + (I_Y + iQ_Y)\cos\phi)e^{i(\omega_{\lambda_1} - \omega_{LO})t}$$

where $\omega$ is frequency, $i$ is the imaginary number, $\phi$ is an angle of difference between a signal's orientation of polarization and an integrated coherent receiver (ICR) and polarities of an optical modulator bias are maintained to ensure signal phases are either both fixed or flipped in X or Y polarization to ensure correct wavelength conversion; and
a signal up-converter configured to modulate split portions of amplitudes and phases optical signal of the first wavelength to a second wavelength and then combine the down-converted modulated optical signal into an output optical signal of a second wavelength while maintaining the polarization information of the original signal and which includes a modulator that is configured to modulate the amplitudes and phases to the second wavelength.

2. The wavelength converter as described in claim 1, wherein a first light emitting device is included which sends light into the signal down-converter at the same wavelength as an original optical signal.

3. The wavelength converter as described in claim 2, wherein the first light emitting device is split off from an optical source of a transponder sitting at a local node.

4. The wavelength converter as described in claim 2, wherein the first light emitting device is a local oscillator laser.

5. The wavelength converter as described in claim 1, wherein the photo-diode is a balanced photo-diode.

6. The wavelength converter as described in claim 1, wherein the amplifier is a trans-impedance amplifiers.

7. The wavelength converter as described in claim 1, wherein the modulator is a dual-polarized dual-nested Mach-Zehnder modulator.

8. The wavelength converter as described in claim 1, further comprising a signal combiner includes a second light emitting device that sends light into modulators at the same wavelength as the output optical signal.

9. The wavelength converter as described in claim 8, wherein the second light emitting device is a laser.

10. A method of wavelength conversion, comprising:
separating, using a polarization-diversity optical mixer, an input optical signal of a first wavelength into a plurality of amplitudes and phases while maintaining the polarization information of the input signal;
generating down-converted signals ($I_X'$, $Q_X'$, $I_Y'$, $Q_Y'$) with relation to an original signal ($I_X$, $Q_X$, $I_Y$, $Q_Y$) with a local oscillator LO laser tuned to an incoming signal wavelength $\lambda 1$ as:

$$I_X' + iQ_X' = ((I_X + iQ_X)\cos\phi + (I_Y + iQ_Y)\sin\phi)e^{i(\omega_{\lambda_1} - \omega_{LO})t}$$

$$I_Y' + iQ_Y' = (-(I_X + iQ_X)\sin\phi + (I_Y + iQ_Y)\cos\phi)e^{i(\omega_{\lambda_1} - \omega_{LO})t}$$

where $\omega$ is frequency, i is the imaginary number, $\phi$ is an angle of difference between a signal's orientation of polarization and an integrated coherent receiver (ICR) and polarities of an optical modulator bias are maintained to ensure signal phases are either both fixed or flipped in X or Y polarization to ensure correct wavelength conversion; and
converting each of the amplitudes and phases into individual photo-currents using a photo-diode;
converting output photo-currents into voltages using an amplifier;
modulating voltages to a second wavelength using a modulator; and
recombining a plurality of amplitudes and phases to generate an output optical signal that maintains a polarization information of the input signal.

11. The method according to claim 10, wherein a first light emitting device sends light into the polarization-diversity optical mixer at the same wavelength that an original optical signal is sent.

12. The method according to claim 11, wherein the light emitting device down-converts the contents of the input signal to a baseband electrical signal.

13. The method according to claim 10, wherein the photo-diode is a balanced photo-diode.

14. The method according to claim 10, wherein the amplifier is a trans-impedance amplifier.

15. The method according to claim 10, wherein the modulator is a dual-polarized dual-nested Mach-Zehnder modulator.

16. The method according to claim 10, wherein a second light emitting device sends light at a wavelength of the output optical signal into a plurality of modulators.

17. The method according to claim 10, wherein the second light emitting device is a laser.

* * * * *